E. Harmon,
Fire-Proof Building.

Nº 12,161.   Patented Jan. 2, 1855.

Attest:  
Chas. L. Hurowkes

Inventor:  
Emanuel Harmon

UNITED STATES PATENT OFFICE.

EMANUEL HARMON, OF WASHINGTON, DISTRICT OF COLUMBIA.

FIREPROOF IRON BUILDING.

Specification of Letters Patent No. 12,161, dated January 2, 1855.

*To all whom it may concern:*

Be it known that I, EMANUEL HARMON, of the city of Washington, in the District of Columbia, have invented a new and useful Improvement in the Construction of Iron Buildings, and I do hereby declare that the following is a full and exact description thereof, reference being had to the accompanying drawings and to the letters of reference marked thereon.

The nature of my invention consists in protecting the framework of iron buildings from the destructive effects of expansion and contraction resulting from changes in atmospheric temperature and from heat generated by conflagrations.

It is particularly applicable to iron buildings constructed with a skeleton framework of iron and a weatherboarding or exterior covering of iron plates separate from the framework and an interior covering of plaster, brick or iron plates. The mode in which I accomplish this protection is by inclosing the skeleton or substantial framework of the building by non-conducting incombustible materials. This I effect in the case of buildings by filling up the space between the inner and outer coverings with plaster of Paris, clay or clay mixed with chopped straw, or any other incombustible nonconducting material, in such a manner as to inclose in the nonconducting substances the skeleton frame work, or by having the wall hollow with a space of dead air insulating the exterior and interior covering from the framework of the building by nonconductors of heat.

To enable others to use my invention I will proceed to describe its construction.

I select for the practical illustration of my invention Stephen Colwell's patent skeleton self-supporting iron wall.

Figure 2:
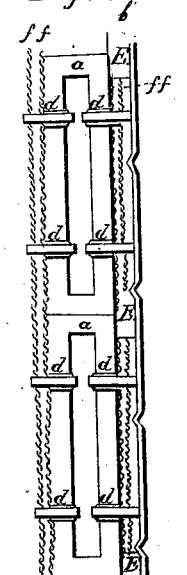
Figure 1:
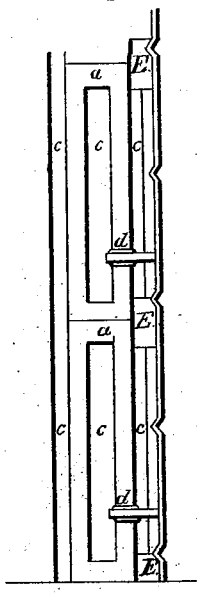

The accompanying drawings Figures 1, and 2, represent sections of portions of this wall, $a$, $a$, Fig. 1, and $a'$, $a'$, Fig. 2 representing the skeleton framework, and $b$, Fig. 1 and $b'$ Fig. 2 the exterior covering.

Fig. 1, represents two of the hollow frames of Mr. Colwell's skeleton wall wholly inclosed in plaster of Paris $c$, $c$, $c$, $c$, a non conductor, the external plates ($b$) being attached in such a manner as to admit between the iron bracket or wires attaching the exterior plates to the framework, of a piece of felt, ($d$) a non conductor. To hold the plates firmly without resting upon the plaster of Paris small pieces of soapstone $e'$, $e'e'$, $e'e'e'$, non conductors, are embedded in the plaster of Paris, and interposed between the outer plates and the skeleton frame.

As a partial or total substitute for the plaster of Paris used as above described, unburnt clay, or clay mixed with chopped straw pisé or concrete, may be used. These materials are nonconductors although to a less degree than plaster of Paris. The clay and straw may be used alone both for the walls of exteriors and apartments, or it may be used to fill up the principal portion of the hollow space, and a thick plastering or coating of the plaster of Paris may be spread upon the clay and straw or concrete.

Fig. 2 represents the mode in which the skeleton frame may be insulated when it is desired, for the purpose of giving lightness to the building, or for other reasons, to have the wall hollow; the dead air in this hollow space acting as a nonconductor.

I cast a sheet of plaster of the requisite thickness in a kind of framework composed of two sheets of wire gauze ($f f, f f$, Fig. 2,) and fasten the sheet of plaster of Paris to the skeleton frame by a wire or bracket interposing a piece of felt between the bracket, and the skeleton frame. Upon the outer sheets of plaster of Paris are placed the external plates of iron. Upon the inner sheet a plastering of ordinary mortar may be laid. The oxidation of the iron and wire may be prevented by a coating of coal tar. By these two modes the skeleton frame is protected from the effects of solar heat or cold and from fire. In case of the warping or peeling off of the exterior plates by the contact of fire in a conflagration, a nonconducting, incombustible body protects the framework of the building, and the only loss that can possibly occur is that of their exterior plates, which can readily be replaced. In case of interior fire the only loss will be that of the ordinary plastering or plates—a similar nonconducting incombustible body protecting the framework.

When it is not desired to render the outside of a building fireproof, as in cases where buildings are isolated, it would be sufficient protection of the skeleton frame from the changes of atmospheric temperature, to insulate the plates from the frame by means of soapstone and felt, as shown in Figs. 1 and 2 and by lining the inside with felt. The same general arrangement of nonconducting materials may be employed for the protection of an iron roof and to iron window shutters, or when desirable to any portion of the interior work of buildings or bridges.

I do not limit myself to any particular mode of confining or inclosing the nonconducting material which I interpose between the skeleton frame of iron and the exterior and interior covering, as a lathing of wood may sometimes answer to confine the nonconducting substances. This lathing to be used only on the inside of the sheet of plaster or other material where it cannot come in contact with fire.

I do not claim the use of an air space or of a nonconducting substance for the purpose of intercepting the communication of heat between two metallic surfaces, or the surfaces of the walls of an iron building. But I do claim as my invention and desire to secure by Letters Patent—

1. The insulation of the skeleton framework of iron buildings from the exterior and interior covering of said framework with their fastenings or attachments, by the interposition of a nonconducting substance such as plaster of Paris, soapstone or felt, in combination with an air space, or sheets of plaster of Paris, felt or other incombustible nonconducting substance in the manner and for the purposes set forth.

2. I claim the above insulation in combination with the entire filling up of the space between the said exterior and interior coverings or surfaces with any incombustible nonconducting substance in the manner and for the purposes set forth.

EMANUEL HARMON.

Witnesses:
CHAS. L. ALEXANDER,
W. A. BOSS.